United States Patent [19]
Weirich

[11] Patent Number: 5,682,210
[45] Date of Patent: Oct. 28, 1997

[54] EYE CONTACT LENS VIDEO DISPLAY SYSTEM

[76] Inventor: John Weirich, 2236 Fuller, #209B, Ann Arbor, Mich. 48105

[21] Appl. No.: 569,870

[22] Filed: Dec. 8, 1995

[51] Int. Cl.[6] ............................... H04N 5/66; H04N 9/12
[52] U.S. Cl. ..................... 348/739; 348/61; 348/169; 345/32
[58] Field of Search .................... 348/739, 795, 348/115, 61–63, 169; 345/7, 8, 32, 102; H04N 5/66, 9/12

[56] References Cited

U.S. PATENT DOCUMENTS

| | | |
|---|---|---|
| 5,166,778 | 11/1992 | Beamon . |
| 5,189,512 | 2/1993 | Cameron . |
| 5,258,785 | 11/1993 | Dawkins . |
| 5,281,957 | 1/1994 | Schoolman . |
| 5,321,416 | 6/1994 | Bassett . |
| 5,359,675 | 10/1994 | Siwoff ........................ 348/62 |
| 5,389,946 | 2/1995 | Tuli . |
| 5,515,070 | 5/1996 | Kawada ........................ 345/7 |

OTHER PUBLICATIONS

Della Bradshaw, BT Keeps an eye on the future, Financial Times (FT)—Friday, Dec. 13, 1991, Edition: London Section: Technology p.: 12.

*Primary Examiner*—Michael H. Lee

[57] ABSTRACT

A contact lens video display system is described which provides a low power, light weight, fully immersive three dimensional visual environment for the wearer. A visual display along with supporting circuitry, battery, and an antenna is formed into a contact lens. The contact lenses are worn on the eyes covering the field of view. Video data is sent to the lens display device from an eyeglass device holding transmitting antenna. The eyeglasses also house eye movement sensors and a backlight for the lens display. The glasses are connected to a data source such as a computer which sends video data to the antenna in the glasses. Furthermore, the eye movement sensors in the glasses send signals to the computer which enables the computer to alter the displayed images in reaction to eye movements and eyelid blinks. The contact lens display device can be connected to any source of video data, thus also enabling the viewing of television, movies, and so on.

8 Claims, 2 Drawing Sheets

EYE CONTACT LENS VIDEO DISPLAY SYSTEM

BACKGROUND OF THE INVENTION

1. Field of the Invention

The invention relates generally to video display devices and more particularly to an eye contact lens video display device.

2. Description of the Prior Art

Computers systems have historically incorporated video displays to convey output information to users. Very often these display devices are large in size and have a shape that resembles a television set. This resemblence is reinforced by the employment of a cathode ray tube (CRT) to generate an image. Images are formed on a two dimensional flat surface which requires the use of three dimensional software programming techniques to create the illusion of three dimensional objects on the screen.

Another type of computer display uses a flat-screen device to generate an image. These flat-screen devices are usually constructed of various electronic components and liquid crystal materials. Thus they are referred to as liquid crystal displays or LCDs. Again, images are created on a flat two dimensional surface and three dimensional graphical programming techniques are required to form three dimensional images.

More recently, helmet shaped display devices have been developed. These devices are worn over the head of the user, sometimes completely covering the head including the eyes and ears. These helmet devices commonly include two display screens, one screen for each eye. Thus by broadcasting a particular image to one eye, and a similar yet slightly turned image to the other eye, a convincing three dimensional effect is achieved. The screens in such helmet devices could be of either CRT or LCD types. These helmets may also contain motion detectors which facilitate the computer generation of images in response to head movements.

Similarly, eye-goggle and eyeglass devices have been developed for displaying video output. Again these devices often incorporate two separate screens to project a unique perspective of a scene to each eye to achieve three dimensional effects. Some experimental devices attempt to draw images directly on the retina of the eye of the wearer by using lasers and mirrors and other optical means.

There are some disavantages to employing any such devices for the purpose of obtaining two and three dimensional display output from a computer system. These disadvantages could be such things as: inconvenience due to the weight and size and general bulkiness of equipment; excessive electrical power consumption; lack of perceptual immersion due to limited depth and width of field of view; inadequate three dimensional image representation; inadequate image sharpness; discomfort; and many other considerations.

Thus a general object of the invention is to provide a better device for viewing the video output of a system such as a computer or television set or other video signal source.

SUMMARY OF THE INVENTION

In order to achieve the above general and other objects, the contact lens display system, according to the present invention, locates the video display directly on the surface of the eye very close to the pupil thus effectively filling the wearer's field of view.

The contact lens display system comprises:

a) a contact lens for each eye;

b) each lens having an electric power source such as a battery, a display means such as a liquid crystal display (LCD), the circuitry control and drive the display, an antenna or other means to receive electromagnetic waves, and other circuitry necessary for programming and control purposes;

c) an optional pair of eyeglasses having a lamp means to provide backlighting for the LCD, a transmitting antenna to broadcast data to the lens antenna, an eye movement tracking means, and connection to the computer or other video data source;

d) an optional headband or other wearable apparatus having a transmitting antenna for use in lieu of the eyeglass device above, and connection to the computer or other video source;

e) a computer or other video data source that is connected to and drives the devices described in (c) and (d).

An embodiment of the present invention operates by having the computer generate video data output signals which are routed to the transmitting antenna located in the eyeglass device. This antenna broadcasts the video data signals for reception by the antenna located inside the contact lens display device. The circuitry in the lens processes these signals such that they are used to control the operation of the LCD. This is how the computer controls the video display in the contact lens.

If the eyes of the wearer shift position, the eye movement tracking means in the glasses will detect the shift and send a signal to the computer indicating the direction of the movement. The computer could then change the scene displayed on the LCD, in reaction to eye movements.

The eyeglass device is equipped with a light that shines on the contact lens thus providing additional backlighting, if needed, for a see-thru type LCD.

In another embodiment of the invention, the transmitting antenna is located in a headband type item or other wearable item like a cap or shirt. Again the transmitting antenna is connected to the computer and functions in a fashion similar to that described for the eyeglasses.

In another embodiment of the invention, the transmitting antenna is contained in a clip-on device that could be fastened to a shirt pocket for example. Such a device might resemble a pen or pocket pointer.

The battery in the contact lens is connected with a positive and negative electrode which pierce the surface of the lens and are used to recharge the battery.

The circuitry in the contact lens can be programmed through the antenna means. For example the LCD could be powered up and down by this means.

The LCD and supporting circuitry are produced by micro-fabrication techniques and methods such as those used to produce integrated circuits.

DETAILED DESCRIPTION OF AN EMBODIMENT

An embodiment of an eye contact lens display system is described in conjunction with FIGS. 1–7. The description is intended to be merely illustrative of the invention and should not be taken in a limiting sense.

Figure 1:
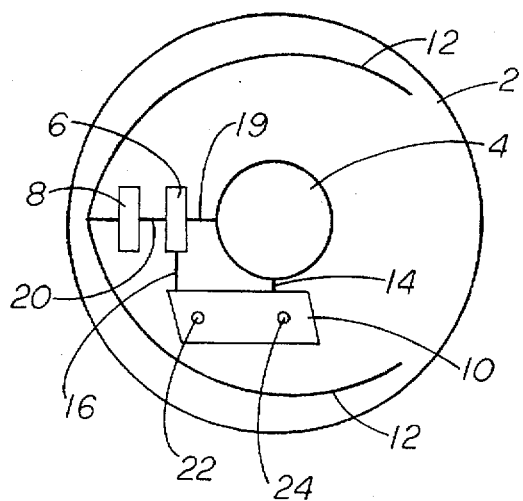
FIG. 1 is a frontal view of the eye contact lens display device.

Referring new to FIG. 1 a frontal view of the contact lens device is shown. The contact lens 2 contains several components. The liquid crystal display 4 is located in the central region of the lens in order to ensure coverage of the pupil area of the eye when the lens is worn by the user. The liquid crystal display 4 is connected to its controlling or driver circuitry 6 through circuits 18. The antenna 12 is connected to radio reception circuitry 8 tuned to receive electromagnetic waves at a particular frequency. The radio reception circuitry 8 is attached to the control circuitry 6 through circuits 20.

The electrical system is powered by a battery 10 which is connected to the controlling circuitry 6 by power circuits 16 and may also be connected to the liquid crystal display 4 by power circuits 14 if necessary. The battery 10 has two electrodes, a negative electrode 22 and a positive electrode 24. These electrodes pierce the surface of the contact lens and are employed to recharge the battery.

Figure 2:
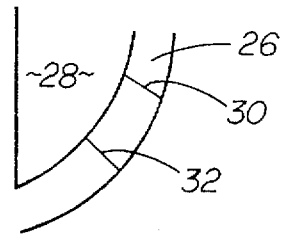
FIG. 2 is a detail side view of the battery and lens.

FIG. 2 shows a detail side view of the battery electrodes. The battery 28 is connected to a positive electrode 30 and a negative electrode 32. These electrodes pass through the contact lens material 1 and emerge at the lens surface. This allows the electrodes to be connected to an electrical means to recharge the battery.

Figure 3:
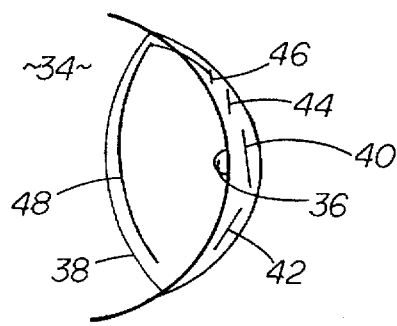
FIG. 3 is a side view of the contact lens device in place on the eye.

FIG. 3 shows a side view of the contact lens display device as it is worn over the eyeball. The contact lens 38 fits ever the surface of the eye 34. The display means 40 is thereby located over the pupil of the eye 36 filling or partially filling the eye's field of view. The battery 42, driver and controller logic 44, radio receiver 46, and receiving antenna 48 are shown.

Figure 4:
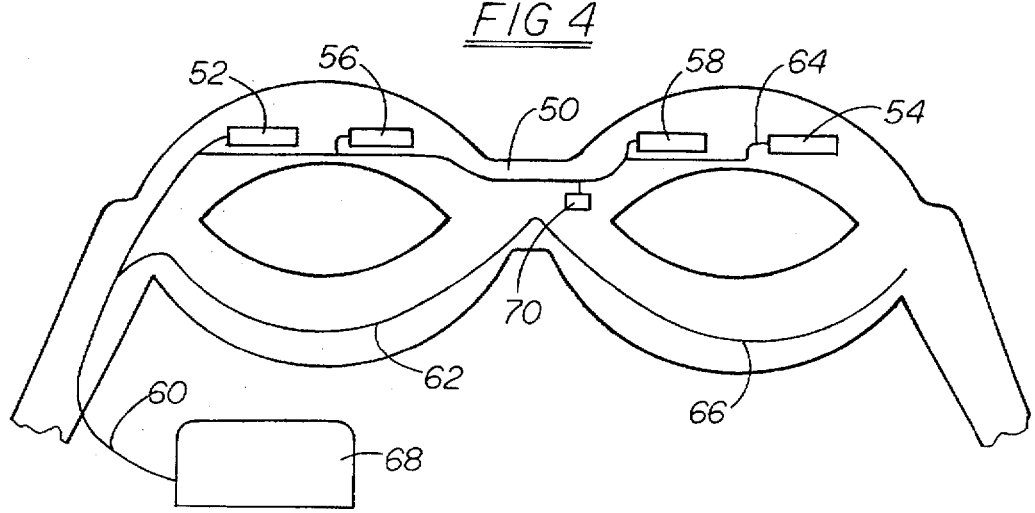
FIG. 4 is a rear view of the eyeglass apparatus.

FIG. 4 shows a rearview of the eyeglass device. The eyeglass frames 50 support the various means used to enable features of the contact lens display device. A lamp for the left eye 52 and the right eye 54 are shown. These provide additional backlighting for the LCD if needed. An eye movement tracking means for the left eye 56 and right eye 58 are shown. These means sense the movement of the eyeball and can also sense eyelid closing such as when an eye is blinked. The transmitting antenna for the left eye 62 and right eye 66 are shown. It is possible that each antenna would broadcast the video data at a unique frequency thus allowing a unique image to be sent to each eye for a three dimensional effect. Alternatively, the antennas may broadcast at the same frequency and have the programming in each contact lens device select the particular data intended for it. The eyeglasses are connected with the computer and power source 68 through the cable 60. Power is supplied to the lamps 52 and 54 and eye movement detectors 56 and 58 through the wire 64. Alternatively, power could be supplied by a battery 70.

Figure 5:
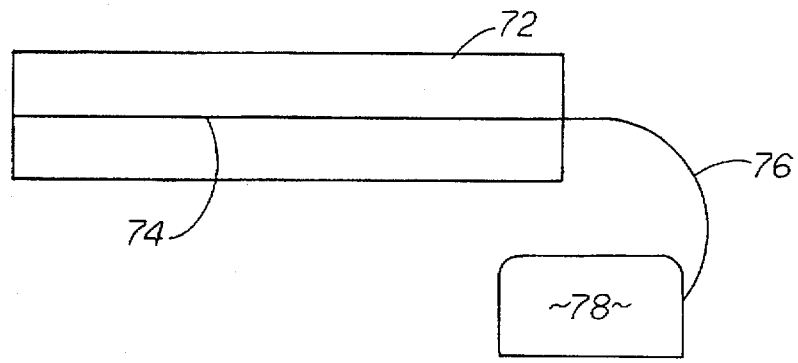
FIG. 5 is a side view of the headband apparatus.

FIG. 5 shows a side view of a head band apparatus 72 that supports the transmitting antenna 74. Again, there may be two antennas to broadcast at two unique frequencies, one for each eye. This means is attached to the computer and power source 78 by wires 76. This apparatus could be used to transmit video data to the contact lens device if the eyeglass device were not being used.

Figure 6:
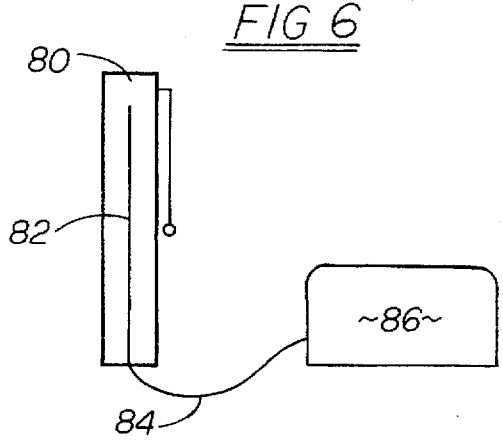
FIG. 6 is a side view of the the dip-on antenna device.

FIG. 6 shows a side view of a clip-on apparatus 80 that could be clipped into a shirt pocket, for example. The apparatus holds the transmitting antenna 82 and is attached to the computer and power source 86 through the wires 84.

Figure 7A:
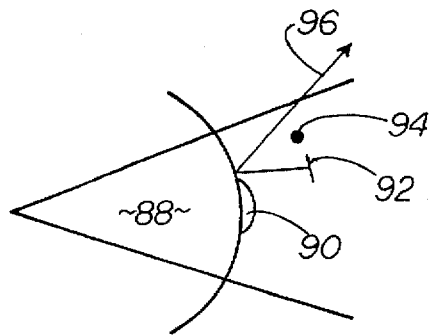
FIGS. 7a–b shows the eye movement detection apparatus.
Figure 7B:
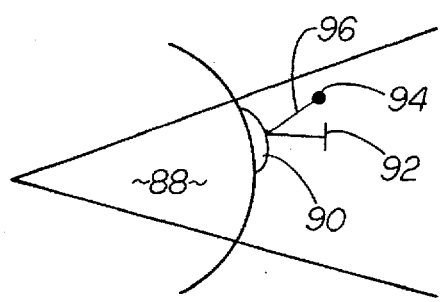

FIG. 7 illustrates the operation of the eye movement detection apparatus. In FIG. 7A the cornea 90 of the eye 88 is directed to the horizontal. A lamp 92 shines light onto the eye which is reflected off its surface 96. The lamp 92 generates light at a particular frequency which is detectable by an optical sensor 94. In this case the reflected light 96 does not strike the optical sensor 94. In FIG. 7B the cornea 90 of the eye 88 is directed in an upward fashion. In this case the reflected light 96 strikes the optical sensor 94 thus allowing the position of the eye to be calculated.

The position and movements of the eye can therefore be calculated by installing a sufficient number of optical sensor devices in the eyeglass apparatus. Additionally, eyelid blinks could also be sensed by this means. This information can be used to change the image displayed on the LCD in response to eye movements and eyelid blinking.

There are many variations on the embodiment described above that can be accomplished, some examples would include the following.

All or some of the components of the contact lens display device identified seperately could be integrated together into smaller number of circuits or one integrated circuit.

The transmitting and receiving antenna means could be replaced by micro-current generators and receivers that would enable data transmision directly through the wearer's skin. For example, the computer would output video data in the form of microcurrents to electrodes attached to the users skin. These microcurrents would travel to the users eyes where they would be detected by microcurrent sensors embedded in the contact lens device.

The source of data could be a television set, a video camera, a video player, or any other source of digital or analog video data.

The contact lens display device could be enabled to broadcast information from its own antenna to the antenna contained in the eyeglasses or headband. This reverses the flow of data and allows feedback and conversational type data exchanges to be programmed into the various means of the system.

From my description above it will be apparent that there has been provided a better means for viewing video data using the eye contact lens display system. Variations and modifications in the system described will undoubtly suggest themselves to those skilled in the art. Accordingly, the foregoing description should be taken as illustrative, and not in a limiting sense.

I claim:

1. A visual display system comprising:
    an eye contact lens and visual information display means forming a part of said lens,
    said visual information display means comprising an opto-electronic display, a programmable electric circuit in communication with the display, an electromagnetic wave antenna and receiver in communication with the programmable electric circuit and a first source of electric energy in communication with the electric circuit and the receiver, whereby electromagnetic waves are converted by the antenna, receiver, electric circuit and display into a visual display viewable by a wearer of the eye contact lens, and including means to track eye movement of a wearer of the contact lens comprising lamp means and eye movement detection means both locatable adjacent the wearer's eye and means to communicate eye movement information arising from lamp light reflected to the eye movement tracking means to the programmable electric circuit.

2. The visual display system of claim 1 wherein the means to communicate eye movement information comprises a second antenna, electro-magnetic wave broadcast means attached to the second antenna and a second source of electric energy in communication with the broadcast means.

3. The visual display system of claim 2 including a source of video data in communication with the broadcast means.

4. The visual display system of claim 3 wherein the lamp means, the means to track eye movement and the means to communicate eye movement information are all located on eyeglass frames locatable on a wearer.

5. The visual display system of claim 4 wherein the source of video data is separately locatable on a wearer and in electrical communication with the broadcast means.

6. The visual display system of claim 4 wherein the source of video data includes broadcast means and antenna means to broadcast directly to the electromagnetic wave antenna and receiver of the contact lens.

7. The visual display system of claim 3 wherein the source of video data includes broadcast means and antenna means to broadcast directly to the electromagnetic wave antenna and receiver of the contact lens.

8. The visual display system of claim 1 wherein the first source of electric energy comprises a rechargable battery, said battery including electric access means for recharging at the surface of the contact lens.

* * * * *